United States Patent Office
3,134,638
Patented May 26, 1964

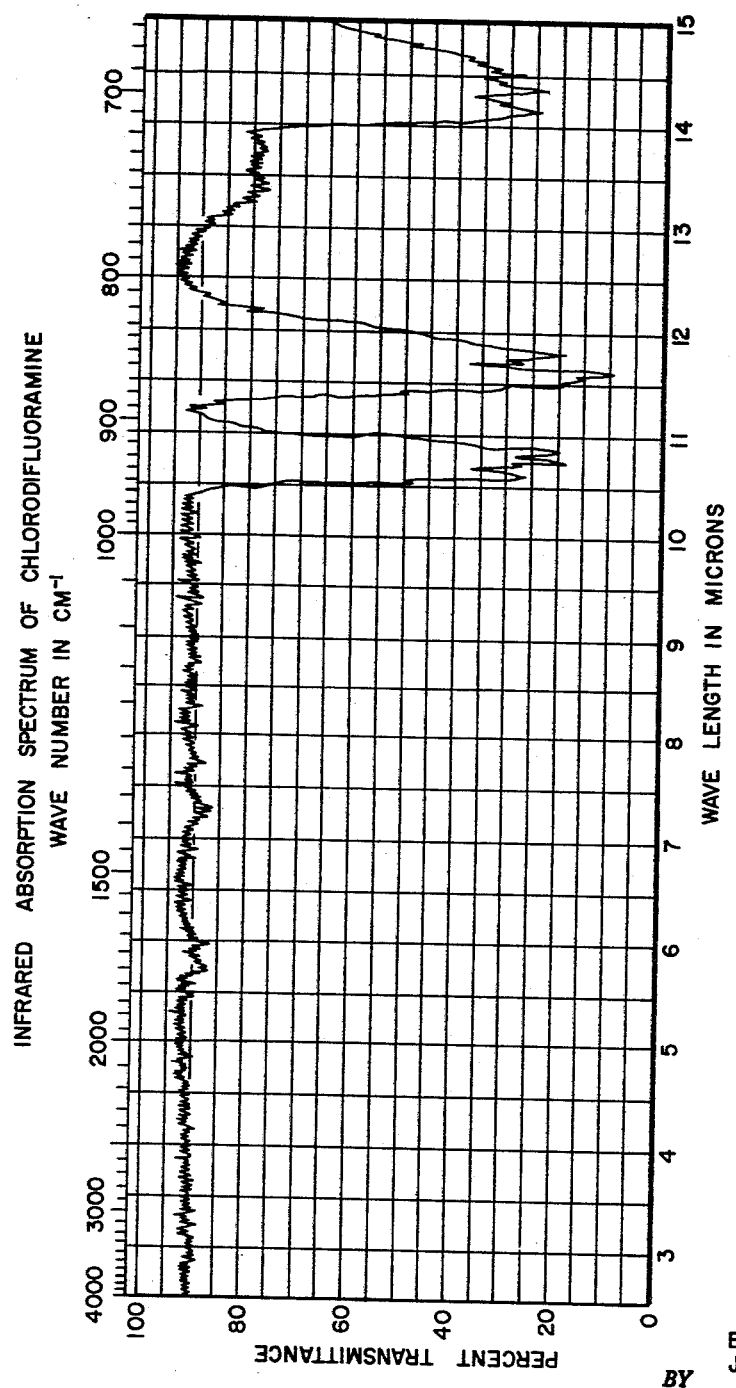

3,134,638
METHOD OF PREPARING CHLORODI-
FLUORAMINE
Emil A. Lawton, Woodland Hills, and John Q. Weber,
Topanga, Calif., assignors to North American Aviation,
Inc.
Filed Aug. 30, 1961, Ser. No. 135,414
2 Claims. (Cl. 23—14)

This invention relates to the compound chlorodifluor-amine and methods for its preparation. This application is a continuation-in-part of our co-pending application, Serial No. 36,238, filed June 15, 1960, and entitled, "Preparation of Chlorodifluoramine," now Patent No. 3,077,377.

Chlorodifluoramine is a compound found to be useful in the preparation of NF compounds such as, for example, tetrafluorohydrazine, a very high energy oxidizer. It has also been found that chlorodifluoramine is useful in the preparation of other oxidizers and propellants. It is, therefore, an object of this invention to provide chlorodifluoramine and novel methods for its preparation.

The objects of this invention are accomplished by the compound chlorodifluoramine having the formula $ClNF_2$. The compound may be prepared by several methods. For example, chlorodifluoramine is prepared by reacting difluoramine with carbonyl chloride. This reaction is preferably conducted at elevated temperatures and the reaction product gases condensed by cooling and fractionated to obtain the product.

The reaction is preferably conducted in the absence of a solvent and the rate of reaction is dependent upon the temperature employed. The reaction between carbonyl chloride and difluoramine is slow at ordinary ambient temperatures and, thus, elevated temperatures are preferred. Particularly preferred temperatures are between 100° C.–200° C. since the reaction proceeds at a more rapid rate in this temperature range. When temperatures approaching 200° C. are employed, the reaction may be complete in from one to six hours, or more. However, when temperatures under 110° C. are employed, reaction times may be as much as forty hours. The actual reaction time depends upon the desired state of completeness of the reaction and longer times may be employed.

Since the reaction is believed to proceed according to the following equation:

it is preferred that for each mol of carbonyl chloride employed three mols of difluoramine be used. Preferably the carbonyl chloride is used in excess to obtain a better utilization of difluoramine.

When the reaction is conducted in glass apparatus, products containing silicon and fluorine often result. In addition to chlorodifluoramine and the various silicon-containing products, ammonia or urea and ammonia salts result from the reaction. To separate the desired chlorodifluoramine from the reaction products all of the gases produced in the reaction may be chilled to —196° C. The chlorodifluoramine may then be obtained by fractional condensation of the collected product under high vacuum conditions. Chlorodifluoramine will not condense at —142° C. but will condense at —196° C. under high vacuum conditions. Therefore, when the collected product is allowed to vaporize, a series of cold traps is preferably employed to eliminate side products. However, since some of the side products produced in the reaction will also pass a —142° C. trap, ether may be added to the reaction product to complex any HCl and silicon and fluorine containing-compounds. In this method relatively pure chlorodifluoramine will be collected at —196° C.

The following examples illustrate the preparation of chlorodifluoramine and carbonyl chloride.

Example 1

Difluoramine, 197 parts by volume, and 84 parts by volume carbonyl chloride were reacted in a glass apparatus at 105° C. for 24 hours. The gaseous reaction products were collected in a cold trap at —196° C., and then fractionated in a high vacuum line through a series of cold traps at temperatures of —112, —142, and —196° C. $SiF_4$ and chlorodifluoramine were collected in the trap cooled to —196° C. Pure chlorodifluoramine is separated from the other products by refractionation after the addition of diethyl ether.

Example 2

The procedure of Example 1 is repeated except that the reaction is conducted at 192° C. for ten hours. A good yield of chlorodifluoramine is recovered from this reaction. Alternatively, the reaction may be conducted at 200° C. for six hours, 150° C. for from 10–15 hours, or any convenient temperature for the appropriate time within the range specified above.

The compound $ClNF_2$ may also be prepared by a process which comprises contacting (1) difluoramine with (2) either hydrogen chloride or a combination of hydrogen chloride, water, and chlorine, whereupon (1) and (2) react to produce chlorodifluoramine. With HCl alone, the reaction is believed to proceed according to the equation

The reactants, difluoramine and hydrogen chloride, react upon contact at temperatures ranging from about —142° C. to about 102° C. At —142° C., the difluoramine and hydrogen chloride are both solidified. Hence, since mobility of the molecules of the reactants and products is limited in the solid state, no advantage is gained in going to lower temperatures. Temperatures below —142° C. may be employed, if so desired. There is, however, a greater danger of explosion at lower temperatures. At 102° C., the amount of the desired product chlorodifluoramine is reduced to a minimum with the predominant product being tetrafluorohydrazine. Hence, no purpose is served in carrying out the reaction above about 102° C. Therefore, an embodiment of this invention is the carrying out of the process with anhydrous HCl described hereinabove within the temperature range of from about —142° C. to about 102° C.

A convenient method of bringing the reactants into reactive contact with each other is to condense the components at suitable low temperatures, as for example, the temperature of —142° C. and thereafter allowing the components to return to a temperature at which both are in the gaseous phase. Intimate contact between the two reactants is accomplished and high yields of the product chlorodifluoroamine are obtained.

A modification of this process is to carry out the reaction in the presence of water with the addition of chlorine and an alkali metal chloride. With water as a diluent, the reaction not only proceeds at a more uniform rate but is found to be much more rapid. An added advantage of running the reaction in a water diluent is the increased safety factor since a dilute solution of difluoramine in water is much less susceptible to explosive decomposition. Another advntage is that the water acts as the complexing agent, therefore no other complexing chemical need be added in order to obtain the chlorodifluoramine product in pure form.

In carrying out the reaction in a water solution, an excess of water is employed since it serves mainly as a diluent. There is no particular relation between the concentrations of the hydrogen chloride, the chlorine and the alkali metal chloride that need be observed so long as the concentration of each are sufficient for the formation of chlorodifluoramine upon the addition of difluoramine. For example, good results are obtained when the mol ratio of HCl-to-Cl$_2$ varies from about 1:5 to about 5:1. The same holds true for the mol ratio of HCl-to-MCl, wherein M represents an alkali metal. The amount of difluoramine added to the solution preferably does not exceed the amount of HCl present in terms of mol units in order to get maximum conversion of the HNF$_2$ to ClNF$_2$. Therefore, good results are obtained, for example, when the mol ratio of HCl-to-HNF$_2$ varies from about 10:1 to about 1:1. In order to obviate separation of the product from atmospheric gaseous components or other gaseous contaminants, it is preferred that the reaction be carried out in a closed system from which atmospheric and other gases have been removed. The carrying out of this reaction in a water diluent constitutes a preferred embodiment of this invention.

The following examples will more clearly illustrate this process. The amounts, where given in parts by volume, are at standard temperature and pressure conditions.

*Example 3*

To an evacuated reaction vessel equipped with gas inlet and outlet means, heating and cooling means, and pressure measuring means, were added substantially 22.6 parts by volume of hydrogen chloride and substantially 29.6 parts by volume of difluoramine while maintaining the reaction vessel at substantially —142° C. The temperature in this instance was obtained by a methylcyclopentane. The reaction vessel and its components were then permitted to warm up to an ambient temperature of 25° C. and maintained at this temperature for a period of substantially 22 hours. During this time a deposit of ammonium chloride was formed on the inside surface of the reaction vessel walls. The volatile reaction product was collected and upon analysis was found to contain 5.3 parts by volume of difluoramine, 12.7 parts by volume of chlorodifluoramine, together with unreacted hydrogen chloride and SiF$_4$, the latter coming from reaction with the glass walls of the reaction vessel. This represents a 78 percent yield, based on the amount of difluoramine used up.

To purify the chlorodifluoramine, an excess of dimethyl ether was added to the reaction vessel and the contents thoroughly mixed by shaking in order to form a complex with the hydrogen chloride, SiF$_4$, and any unreacted difluoramine present. Since the boiling point of both the HCl and SiF$_4$ was close to that of ClNF$_2$, the mixture containing the complexing agent, complexed components, and the product was then subjected to fractional condensation by passing through successive cold traps maintained at —142° C. and —196° C. The ether and complexed materials, as well as any other impurities, were collected at —142° C. and the ClNF$_2$ product was collected in the trap maintained at —196° C. Chlorodifluoramine was collected in substantially 78 percent yield, as stated hereinabove. Chemical analysis of the product shows substantially 40 weight percent chlorine, 44 weight percent fluorine, and 16 weight percent nitrogen, corresponding to the formula ClNF$_2$. The molecular weight determined by vapor density was 89.5 (calculated 87.5). The infrared spectrum of the product compound is given in the accompanying drawing. This spectrum is identical to that reported in J. Am. Chem. Soc., 82, 2400 (1960). Chlorodifluoramine does not decompose at ambient temperatures and can be stored in Pyrex vessels.

Chlorodifluoramine reacts rapidly with mercury at room temperature to form tetrafluorohydrazine and mercurous chloride.

*Example 4*

The procedure of Example 3 was repeated with the modification that the reaction was carried out in the presence of dimethyl ether and the reaction vessel and its contents were permitted to return to ambient temperature slowly over a period of 8 hours. Thus, the condensed phase was present over a tmperature range of from about —142° C. to about —20° C. The reaction vessel was subsequently cooled and again allowed to warm up. This cycle was repeated 15 times in order to obtain as heavy a deposit of ammonium chloride on the inner surface walls of the reaction vessel as in Example 3. Approximately 4 parts by volume of chlorodifluoramine were formed and 6 parts by volume of N$_2$F$_4$ were obtained. This represented a yield of substantially 25 percent, based on the amount of difluoramine used up in the reaction.

*Example 5*

The procedure of Example 3 was repeated employing substantially 45.4 parts by volume of difluoramine, HNF$_2$, and 46.5 parts by volume of hydrogen chloride. The reaction was carried out at a temperature of substantially 25° C. over a period of substantially 100 hours. Substantially 18 parts by volume of ClNF$_2$ was formed, together with substantially 1 part N$_2$F$_4$. Unreacted difluoramine amounting to substantially 5 parts by volume remained in the reaction vessel. The yield was 70 percent of ClNF$_2$, based on the decrease in the HNF$_2$.

*Example 6*

The procedure of Example 3 was repeated employing 15.6 parts by volume of HNF$_2$ and 18 parts by volume of HCl. The reaction was carried out at a temperature of substantially 50° C. for a period of substantially 90 hours. At the end of this time, the gaseous components in the reaction vessel were found to contain substantially 1.5 parts by volume of ClNF$_2$ and 6 parts by volume of N$_2$F$_4$.

*Example 7*

The apparatus of Example 3 was employed in carrying out the reaction in which 14.3 parts by volume HNF$_2$ and 13.2 parts by volume of HCl were used. The vessel and contents were maintained at a temperature of substantially 102° C. for a period of three hours. The gaseous components at the end of this time contained a trace of ClNF$_2$ and 5 parts by volume of N$_2$F$_4$.

Chlorodifluoramine reacts with amines to produce tetrafluorohydrazine, as shown in the following example.

*Example 8*

To an evacuated reaction vessel of the type described in Example 3 were added 6.7 parts by volume of ClNF$_2$ and 11.5 parts by volume of dimethylamine dissolved in 20.8 parts dimethyl ether while maintaining the reaction vessel at temperatures within the range of —142° C. to about 25° C. The components were next allowed to stand at 25° C. for a period of 18 hours, during which time a white solid was formed in the liquid phase. The contents of the vessel were then fractionated and analyzed. The solid was found to be mainly dimethylamine hydrochloride. No alkylated hydrazines were present. The fractionation of the volatile products produced ether, 2.3 parts by volume of unreacted amine and 3.2 parts by volume of tetrafluorohydrazine.

*Example 9*

The procedure of Example 8 was repeated with the modification that diethyl ether was substituted for dimethyl ether and the temperature was maintained at —80° C., or lower, during the reaction period. It was found that the ClNF$_2$ was nearly quantitatively converted to N$_2$F$_4$.

*Example 10*

In the apparatus described above, 12.5 parts by volume of dimethylamine were reacted with 4 parts by volume of $N_2F_4$ in the vapor phase at substantially 80° C. for a period of substantially 2 hours. The products upon analysis were found to be methylazide and smaller amounts of diazomethane and azomethane.

Diazomethane is widely used in chemical syntheses.

*Example 11*

In the apparatus described above, 8 parts by volume of $ClNF_2$ were reacted with 7 parts by volume of sodium methoxide at ambient temperatures of substantially 25° C. The products, upon analysis, were found to be a white solid consisting of a combination of sodium chloride and sodium fluoride, and $N_2F_4$. A small amount of another substance was present.

*Example 12*

To the evacuated reaction vessel of Example 3 was added substantially 0.36 part by weight of difluoramine and 400 parts of water. To this was then added substantially 200 parts of ice water, 1.8 parts of HCl, 3.5 parts of $Cl_2$, and 2.9 parts of NaCl. Effervescence of the liquid in the reaction vessel was immediately observed. The gaseous components were withdrawn from the reaction vessel and passed through two cold traps maintained at −142° and −160° C., respectively, and the chlorodifluoramine was collected in the receiving vessel maintained at −196° C. The amount of product was 0.39 part, equivalent to a 66.7 percent yield, based on the amount of $HNF_2$ used up.

*Example 13*

The procedure of Example 12 is repeated, with the modification that KCl is used in place of NaCl and the total amount of water employed is 200 parts and the amount of HCl is 2 parts. The mol ratio of HCl-to-$Cl_2$ is substantially 1:5 and the mol ratio of HCl-to-KCl is likewise substantially 1:5. The mol ratio of HCl-to-$HNF_2$ added is substantially 1:1. A high yield of chlorodifluoramine is obtained.

*Example 14*

The procedure of Example 12 is followed, with the modification that RbCl is used in place of NaCl, the amount of water is substantially 1000 parts and the amount of HCl is substantially 3 parts. The mol ratio of HCl-to-$Cl_2$ is substantially 5:1 and the mol ratio of HCl-to-RbCl is also substantially 5:1. The mol ratio of HCl-to-$HNF_2$ added is substantially 10:1. The temperature of the reactants is maintained at substantially 50° C. in this example. A good yield of $ClNF_2$ is obtained.

The complexing agent used in the illustrative examples hereinabove for removing HCl was an ether, namely, dimethyl ether. However, many other Lewis bases are used. The ethers that are employed as complexing agents are hydrocarbon ethers having from 2 to about 12 carbon atoms and include alkyl ethers, alkyl-aryl ethers, aryl-substituted alkyl ethers, and alkyl-substituted aryl ethers, as well as mixed aryl and alkyl ethers. Also included are cyclic ethers. Non-limiting examples of various ethers are dimethyl ether, diethyl ethers, methyl ethyl ethers, dihexyl ether, methyl phenyl ether, dioxane, etc. Water also serves as a complexing agent.

Although the invention has been described in detail, it is to be clearly understood that the same is by way of illustration and example only and is not to be taken by way of limitation, the spirit and scope of this invention being limited only by the terms of the appended claims.

We claim:

1. The process for the preparation of chlorodifluoramine which comprises reacting difluoramine with carbonyl chloride.

2. The process for preparing chlorodifluoramine which comprises reacting difluoramine with carbonyl chloride at elevated temperatures, cooling gaseous reaction products to below the liquefication temperature and recovering chlorodifluoramine from the cooled reaction product.

References Cited in the file of this patent

Noller: Chemistry of Organic Compounds, Lawonders (1951), pp. 297, 235.

Petry: J.A.C.S., vol. 82, pp. 2400–2401, May 5, 1960.